US008319778B2

(12) United States Patent
Sayre et al.

(10) Patent No.: US 8,319,778 B2
(45) Date of Patent: Nov. 27, 2012

(54) VARIABLE MOTION BLUR ASSOCIATED WITH ANIMATION VARIABLES

(75) Inventors: Rick Sayre, Kensington, CA (US); Martin Reddy, San Francisco, CA (US); Peter Bernard Demoreuille, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 12/023,312

(22) Filed: Jan. 31, 2008

(65) Prior Publication Data
US 2008/0297518 A1 Dec. 4, 2008

Related U.S. Application Data

(63) Continuation of application No. 11/058,098, filed on Feb. 14, 2005, now Pat. No. 7,348,985.

(60) Provisional application No. 60/570,874, filed on May 12, 2004.

(51) Int. Cl.
*G06T 13/00* (2011.01)
(52) U.S. Cl. .................. 345/474; 345/473; 345/475
(58) Field of Classification Search .................. None
See application file for complete search history.

(56) References Cited

U.S. PATENT DOCUMENTS

| | | | | |
|---|---|---|---|---|
| 5,809,219 | A * | 9/1998 | Pearce et al. .................. 345/426 |
| 6,426,755 | B1 * | 7/2002 | Deering ......................... 345/581 |
| 6,654,020 | B2 * | 11/2003 | Mori ............................. 345/475 |
| 6,956,574 | B1 * | 10/2005 | Cailloux et al. .............. 345/473 |
| 7,084,875 | B2 * | 8/2006 | Plante .......................... 345/473 |
| 7,193,629 | B2 * | 3/2007 | Kake et al. ................... 345/581 |
| 2002/0075273 | A1 * | 6/2002 | Marshall et al. ............. 345/581 |

OTHER PUBLICATIONS

Kawagishi, Y.; Hatsuyama, K.; Kondo, K., "Cartoon blur: nonphotorealistic motion blur," Computer Graphics International, 2003. Proceedings , vol., no., pp. 276-281, Jul. 9-11, 2003, URL: http://ieeexplore.ieee.org/stamp/stamp.jsp?arnumber=1214482 &isnumber=27295.*
Maic Masuch, Stefan Schlechtweg, and Ronny Schulz. 1999. Speedlines: depicting motion in motionless pictures. In ACM SIGGRAPH 99 Conference abstracts and applications (SIGGRAPH '99). ACM, New York, NY, USA.*
Ramesh Raskar, Remo Ziegler, and Thomas Willwacher. 2002. Cartoon dioramas in motion. In Proceedings of the 2nd international symposium on Non-photorealistic animation and rendering (NPAR '02). ACM, New York, NY, USA, 7-ff.*
Brostow, Gabriel J., et al., "Image-based motion blur for stop motion animation," Proceedings of the 28th annual conference on Computer graphics and interactive techniques, p. 561-566, Aug. 2001.

* cited by examiner

*Primary Examiner* — Daniel Hajnik
(74) *Attorney, Agent, or Firm* — Kilpatrick Townsend & Stockton LLP; Philip H. Albert

(57) ABSTRACT

Variable motion blur is created by varying the evaluation time used to determine the poses of objects according to motion blur parameters when evaluating a blur frame. A blur parameter can be associated with one or more objects, portions of objects, or animation variables. The animation system modifies the time of the blur frame by a function including the blur parameter to determine poses of objects or portions thereof associated with the blur parameter in a blur frame. The animation system determines the values of animation variables at their modified times, rather than at the time of the blur frame, and poses objects or portions thereof accordingly. Multiple blur parameters can be used to evaluate the poses of different portions of a scene at different times for a blur frame. Portions of an object can be associated with different blur parameters, enabling motion blur to be varied within an object.

18 Claims, 7 Drawing Sheets

VARIABLE MOTION BLUR ASSOCIATED WITH ANIMATION VARIABLES

CROSS-REFERENCES TO RELATED APPLICATIONS

This application claims priority to U.S. patent application Ser. No. 11/058,098, now issued U.S. Pat. No. 7,348,985. This application claims benefit under 35 US.C. 119(e) to U.S. Provisional Patent Application No. 60/570,874, filed May 12, 2004, which is incorporated by reference herein for all purposes. This application is related to "Custom Spline Interpolation," U.S. Provisional Patent Application No. 60/571,027, filed May 13, 2004, and U.S. patent application Ser. No. 11/058,724, filed Feb. 14, 2005, which are incorporated by reference herein for all purposes.

BACKGROUND OF THE INVENTION

The present invention relates to the field of computer graphics, and in particular to methods and apparatus for realistically animating water and other fluids. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Motion blur is a phenomenon resulting in the apparent streaking or blurring of rapidly moving objects. Rapidly moving objects appear to be blurred along the direction of motion relative to the viewer because of persistence of vision effects in the human visual system. Motion blur also occurs in still and motion picture photography as objects move relative to the camera during the period of exposure determined by the camera's shutter. Motion blur may be used to blur moving objects or to blur static backgrounds if the camera is moving.

In movies and photography, motion blur may be used and even exaggerated to provide a sensation of speed or motion. For these reasons, motion blur effects are often added to computer graphics and animation to make images appear as if they were conventionally photographed. Motion blur effects are typically created by evaluating the positions of all of the objects in a scene at slightly different times and then combining and rendering the results. To control the degree of motion blur, animators can specify a time interval between images that is analogous to the exposure time of a conventional camera. Previous motion blur effects apply the same amount of motion blur to all objects in an image. Additionally, the amount of motion blur remains constant over the entire animated sequence.

For improved aesthetics, it is desirable for a system and method to enable animators to vary the amount of motion blur within an image applied to different objects and to different parts of the same object. It is also desirable for animators to be able to vary the amount of motion blur over the course of an animated sequence. It is further desirable for the motion blur effect to be easily integrated within an animation system.

BRIEF SUMMARY OF THE INVENTION

An embodiment of the invention applies different amounts of motion blur to different parts of an image to create a variety of aesthetic effects. Variable motion blur is created by varying the evaluation time used to determine the poses of objects according to motion blur parameters when evaluating the positions of objects at the time of a blur frame. A blur parameter can be associated with one or more objects, portions of objects, or animation variables. The animation system modifies the time of the blur frame by a function including the blur parameter to determine the poses of objects or portions thereof associated with the blur parameter at the time of the given blur frame. The animation system determines the values of animation variables at their modified times, rather than at the time of the blur frame, and poses objects or portions thereof accordingly.

Multiple blur parameters can be used to evaluate the poses of different portions of a scene at different times for a given blur frame time. Objects associated with different blur parameters are evaluated at the same blur frame time, eliminating the need for additional blur frames. Furthermore, portions of an object can be associated with different blur parameters, for example by associating different blur parameters with animation variables controlling different aspects of the object, enabling motion blur to be varied within an object.

In an embodiment, a method of creating variable motion blur comprises determining if a first frame is a blur frame, determining the value of a blur parameter associated with at least a portion of an object for the first frame, and setting an evaluation time based upon the first frame time and the value of the blur parameter if the first frame is a blur frame. If the first frame is not a blur frame, the evaluation time is set based upon the first frame time. The method evaluates the portion of the object associated with the blur parameter at the evaluation time to determine a pose of the object.

In a further embodiment, the steps of determining if the frame is a blur frame, determining the value of the blur parameter, setting the evaluation time, and evaluating the portion of the object are repeated for a second frame occurring after the first frame in an animated sequence. The method combines the portion of the object at the first and second frame times and renders a composite image.

In an additional embodiment, the first frame is a blur frame, the second frame is a blur frame, or both the first and second frames are blur frames.

In another embodiment, determining if the first frame is a blur frame includes evaluating a shutter state parameter. In a further embodiment, setting the evaluation time based upon the first frame time and the value of the blur parameter includes combining the first frame time with a shutter time scaled by the value of the blur parameter.

In still another embodiment, determining the value of the blur parameter includes evaluating a blur animation variable at the first frame time if the first frame is a blur frame, and evaluating the blur animation variable at the time of a primary frame if the first frame is not a blur frame.

In yet a further embodiment, the blur parameter is associated with an animation variable specifying at least a portion of a pose of the object. An interpolation module may be associated with the blur parameter and the animation variable and adapted to execute the steps of determining if the frame is a blur frame, determining the value of the blur parameter, setting the evaluation time, and evaluating the portion of the object. The step of evaluating the portion of the object may include invoking an interpolation function associated with the animation variable to evaluate the animation variable at the evaluation time.

BRIEF DESCRIPTION OF THE DRAWINGS

The invention will be described with reference to the drawings, in which.

DETAILED DESCRIPTION OF THE INVENTION

Figure 1:
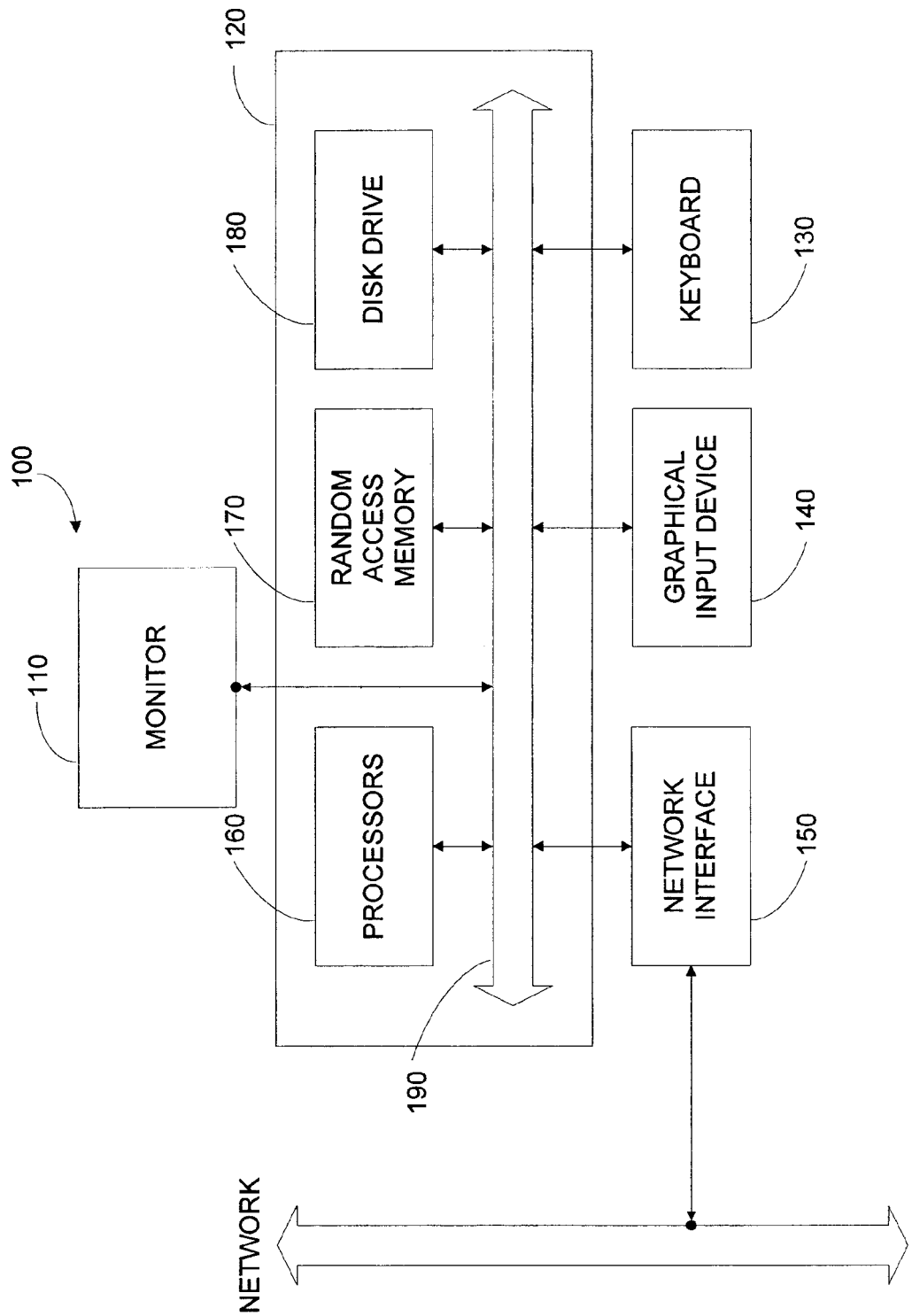
FIG. 1 illustrates a general-purpose computing system suitable for implementing an embodiment of the invention.

FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2A:
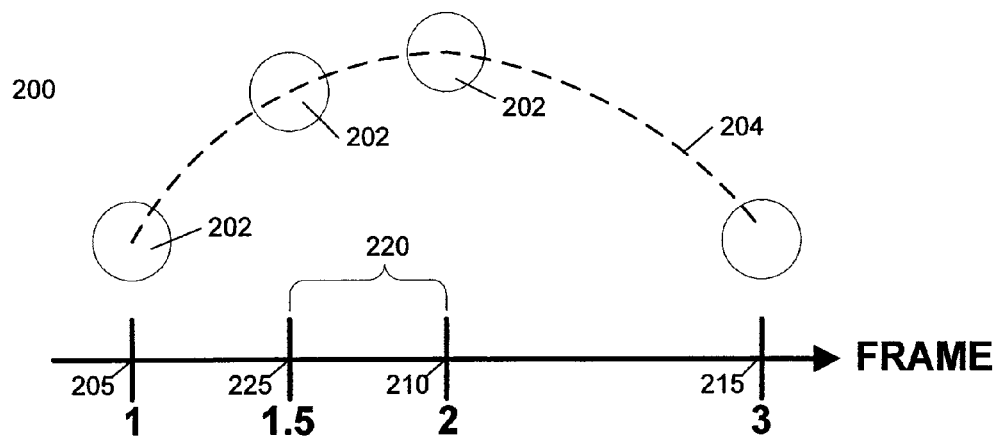
FIGS. 2A-C illustrate example applications of motion blur effects suitable for use with embodiments of the invention.
Figure 2B:
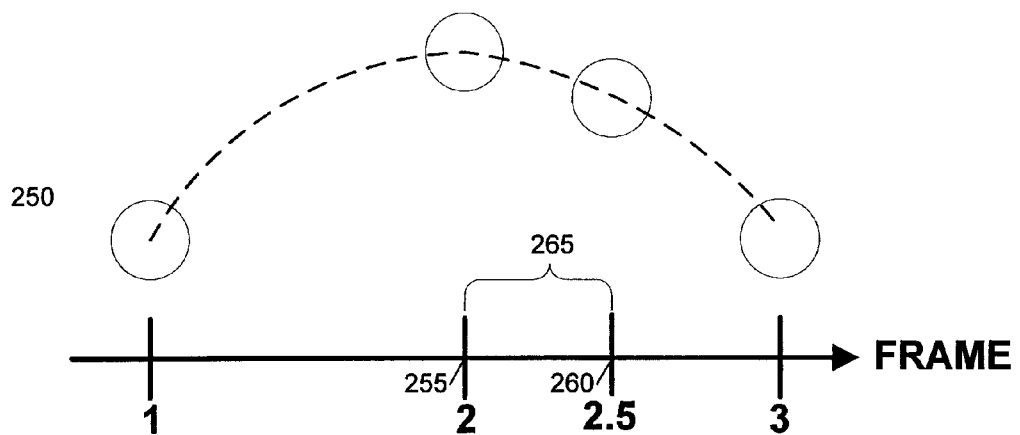
Figure 2C:
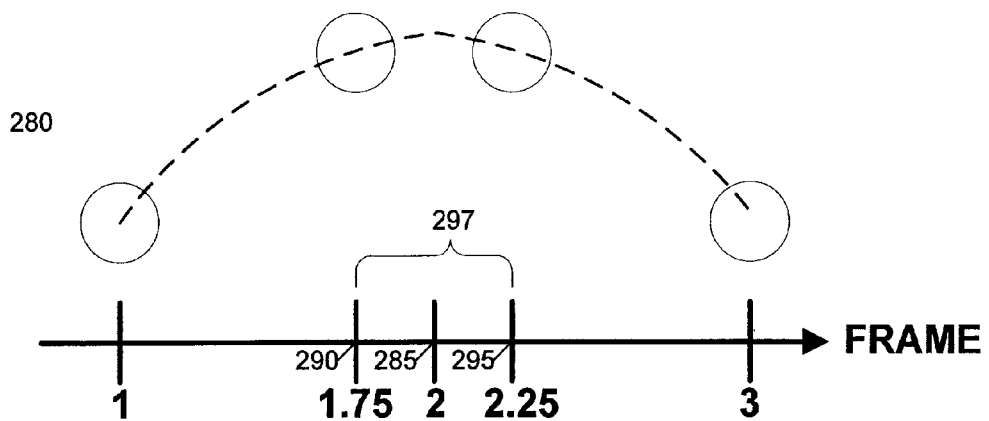

FIGS. 2A-C illustrate example applications of motion blur effects suitable for use with embodiments of the invention. FIG. 2A illustrates an example 200 of a trailing motion blur effect. In example 200, motion blur is created for a given frame of animation, referred to as a primary frame, by evaluating the positions and other aspects, such as color and velocity, of objects at the time of the primary frame and one or more previous frame times, referred to as blur frames, and then combining the objects from primary and blur frame times to create a rendered image. Blur frames may be at non-integral times between frame explicitly defined by the animation. An exposure or shutter time controls the amount of motion blur to be applied. Shutter time can be equivalently defined in terms of seconds, in fractions of the interval between frames, or in degrees, which is traditionally used to express exposure times with reference to a mechanical disk shutter used in conventional film cameras. For trailing motion blur, such as in example 200, the beginning of the time interval defined by the shutter time, referred to as the shutter opening, is at the time of the primary frame. This time interval extends backwards in time and ends with the shutter closing.

For example, an animator may define the motion of an object 202 along a path 204 over frames 1, 205; frame 2, 210; and frame 3, 215. Motion blur for frame 2, 210, is created by evaluating the position of object 202 in its position in frame 2, 210, as a primary frame, and its position in one or more preceding blur frames. In this example, the shutter time covers the interval of time 220 from the primary frame, 210 to halfway to frame 1, 205. Object positions at the time of one or more blur frames can be combined within this interval 220 of shutter time. For example, blur frame 225 can be evaluated to determine the position of object 202 in an intermediate position along path 204. The positions and other aspects of objects at the times of the primary frame 210 and one or more blur frames, such as blur frame 225, are then combined and rendered to create a final image for frame 2, 210, showing motion blur for object 202.

An image including motion blur can be rendered in a number of different ways. In some renderer implementations, the positions and other aspects of objects at the times of the primary frame and one or more blur frames are passed to the renderer. The renderer then renders one or more images at various times within the time interval defined by the primary frame 210 and its shutter time. In an embodiment, the poses of objects at the render time can be determined by interpolation from their poses at the times of the primary frame and one or more blur frames. The render time, which is the time at which objects are evaluated to create the rendered image, can be linearly located within the time interval for each frame. Alternatively, the render time can be stochastically or pseudo-randomly located within the time interval for each frame defined by the shutter time to avoid aliasing artifacts. In other renderer implementations, motion blur is performed as a post-rendering process. The renderer creates discrete images at the beginning and end of the shutter time for each frame (and possibly one or more intermediate times if multisegment motion blur is being performed). The discrete images are combined to create a final image with motion blur. In a further implementation, motion vector images or other control data is used to describe the path of pixels between the discrete images. This control data is used to smear or blur the pixels in the discrete images to create a final image with motion blur.

FIG. 2B illustrates an example 250 of a leading motion blur effect. In example 250, motion blur is created for a primary frame 255 by evaluating the positions of objects at the time of the primary frame 255 and one or more following blur frames, such as blur frame 260, and then combining the results. As with trailing motion blur, the example 250 of a leading motion blur effect uses blur frames located within the time interval 265 defined by a shutter time.

FIG. 2C illustrates an example 280 of a centered motion blur effect. In example 280, motion blur is created for frame 285 by evaluating the positions of objects at the time of a primary frame 290 located prior to the frame 285 and one or more following blur frames, such as blur frame 290, and then combining the results. As with trailing motion blur, the example 280 of a centered motion blur effect uses blur frames located within the time interval 297 defined by a shutter time.

Typically, the positions and shapes of objects are defined by the values of animation variables, referred to as avars, which are parameters used by functions to move or modify objects. Animation variables and their associated functions are used to abstract complicated modifications to a character model to a relatively simple control. For example, animation variables can specify the position and orientation of objects. Animation variables can also specify the positions and rotation angles of the joints of a character model, thereby positioning the character model's limbs and appendages. More complicated animation variables can define the degree of opening of a character's mouth. In this example, the value of the animation variable is used to determine the position of the many different parts of the character model needed to open the characters mouth to the desired degree. To determine the poses of objects, which are the objects' positions and/or shapes, in a given frame, the animation system normally determines the values of the animation variables at the time of the frame. The animation system then uses the value of the animation variables and their associated functions to determine the poses of objects in the frame. The frame can then be rendered to produce an image.

Applying different amounts of motion blur to different parts of an image, referred to as variable motion blur, can be used for a variety of aesthetic effects. For example, motion blur can be increased on some objects in an image to provide a heightened sensation of speed, while other objects in an image have less motion blur applied to remain clear. In another example, motion blur can be applied to a character model, but selectively decreased on the character model's mouth during dialogue, so as to make the character model's mouth appear sharp and enhance the impact of the dialogue, while blurring fast-moving parts of the character model.

As the amount of motion blur is typically controlled by the shutter time used to render images, one technique for creating variable motion blur is to associate different objects in a scene with different shutter times, and then evaluate objects at the time of each separate blur frames at different times for their associated objects. In this approach, objects associated with each shutter time are positioned according to the time of their associated blur frame. The resulting poses of objects in separate blur frames at different shutter times are then combined with the primary frame and rendered to produce a final image. This approach requires additional time and resources to evaluate additional blur frames for each shutter time used in an image. Additionally, using multiple shutter times to implement variable motion blur does not allow for motion blur to be varied within an object.

An alternative technique for creating variable motion blur is to vary the evaluation time used to determine the poses of objects according to a motion blur parameter when evaluating a blur frame. In this technique, a blur parameter is associated with one or more objects, portions of objects, or animation variables. To determine the poses of objects or portions thereof associated with the blur parameter in a given blur frame, the animation system modifies the time of the blur frame by a function including the blur parameter. The animation system then retrieves the values of the animation variables at the modified time, rather than at the time of the blur frame, and positions objects accordingly. Multiple blur parameters can be used to evaluate the position of different portions of a scene at different times for a given blur frame. In this approach, objects associated with different blur parameters are evaluated at the same blur frame time, eliminating the need for additional blur frames.

Furthermore, portions of an object can be associated with different blur parameters, for example by associating different blur parameters with animation variables controlling different aspects of the object, enabling motion blur to be varied within an object. Blur parameters can also be associated with other aspects of an animated scene. For example, a blur parameter associated with the camera can be used to vary the amount of motion blur in the direction of the camera motion, while leaving motion blur in other directions unchanged. In another example, blur parameters can be associated with lights.

Figure 3:
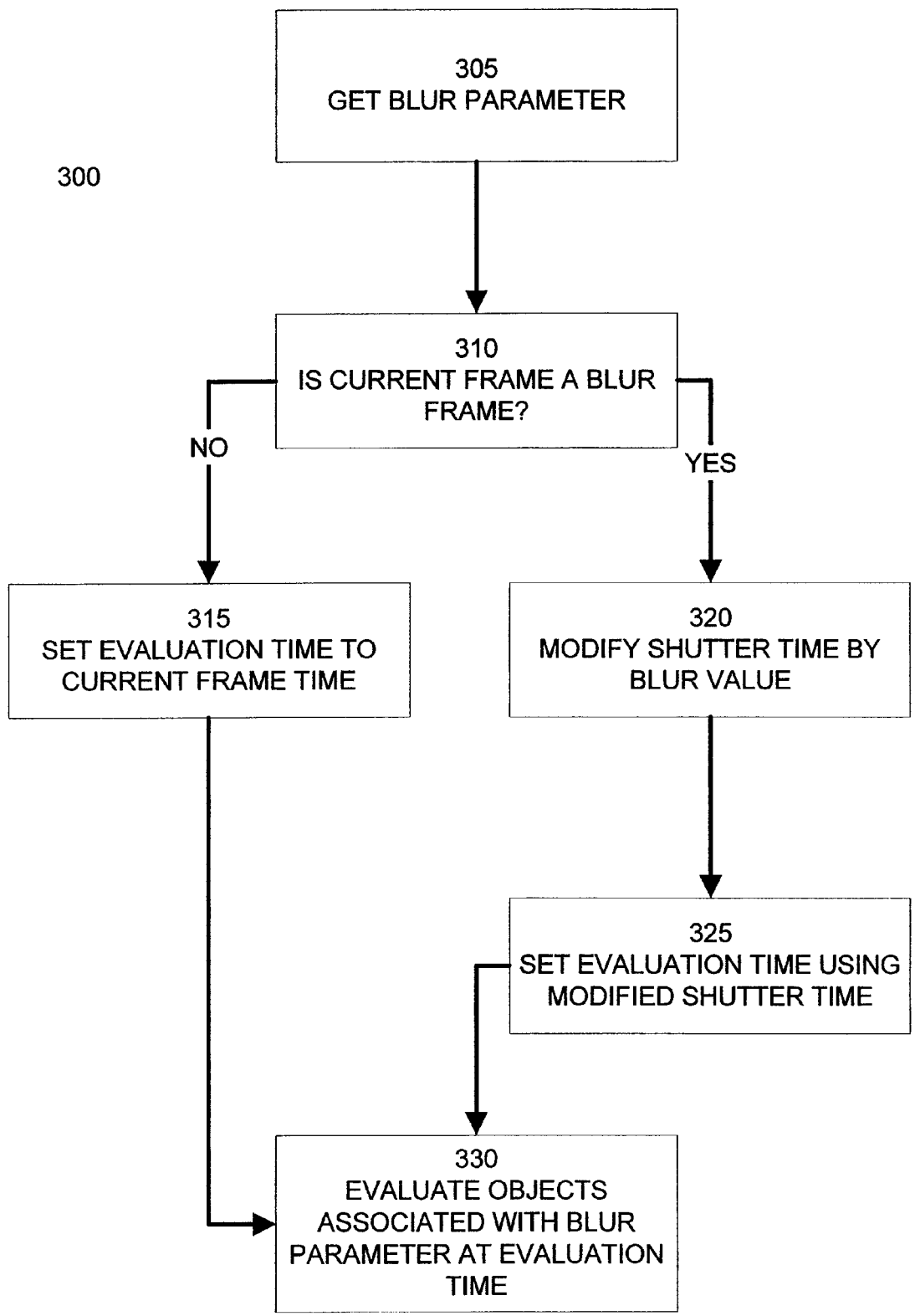
FIG. 3 is a flowchart illustrating a method of variable motion blur according to an embodiment of the invention.

FIG. 3 is a flowchart illustrating a method 300 of variable motion blur according to an embodiment of the invention. The method 300 can be performed during the evaluation of at least one frame, referred to as the current frame, in an animated sequence for each object or animation variable associated with a motion blur parameter. Step 305 retrieves the blur parameter value for the frame being evaluated. In an embodiment, the blur parameter can vary over time, and the blur parameter is evaluated at the time of a shutter opening associated with the current frame. In an embodiment, this time is the same as the time of the primary frame.

Step 310 determines whether the current frame is a blur frame. In an embodiment, one or more shutter state variables track the whether shutter opening or shutter closing events are associated with the current frame. In this embodiment, a shutter opening event indicates that the current frame is not a blur frame. Conversely, the absence of a shutter opening event indicates that the current frame is a blur frame. It should be noted that if multiple blur frames are being evaluated, some blur frames may not coincide with shutter closing events. Alternatively, comparing the time used to evaluate the blur parameter with the time of the current frame may be used to determine whether the current frame is a blur frame. However, in some implementations, for example with a shutter time set to one frame, a frame at a given time may either be a blur frame or a primary frame, depending upon the context.

If the current frame is not a blur frame, then method 300 proceeds to step 315. Step 315 sets the evaluation time for the objects and/or animation variables associated with the blur parameter to the time of the current frame.

Conversely, if the current frame is a blur frame, step 320 modifies the shutter time used to control motion blur by the value of the blur parameter. In an embodiment, the shutter time is linearly scaled by the blur parameter value. An example of this embodiment is the following formula: modified shutter time=default shutter time*blur parameter value)

In this example, the value of the blur parameter ranges from 0.0 to 1.0. A blur parameter value of 0.0 will eliminate motion blur effects for the objects associated with this blur parameter. A blur parameter value of 1.0 will apply the default amount of motion blur to the associated objects. Intermediate values of the blur parameter will apply less motion blur to associated objects. Blur parameter values greater than 1 can be used produce an exaggerated motion blur effect for a variety of aesthetic effects, such as creating an enhanced sensation of speed or to selectively undo the staccato motion in a scene resulting from a very short shutter time.

Following step 320, step 325 determines an evaluation time for objects and/or animation variables associated with this blur parameter using the modified shutter time. In an embodiment, the evaluation time is set to the time of the primary frame offset by the modified shutter time. In the case of a trailing motion blur effect, the evaluation time is the modified shutter time subtracted from the time of the primary frame. Conversely, the modified shutter time is added to the time of the primary frame for a leading motion blur effect. For multisegment motion blur, the time interval between the primary frame time and the primary frame time offset by the modified shutter time is further subdivided into two or more blur frames times, each of which is processed by the remaining steps of method 300 in the manner discussed below.

Following either step 315 or step 325, step 330 evaluates the objects associated with the blur parameter at the evaluation time. In an embodiment, the animation system retrieves the values of the animation variables associated with the blur parameter at the evaluation time and poses objects accordingly. In one implementation, the values of the associated animation variables at the blur time are input to one or more functions. The output of these functions specify the position of one or more control points of a model, which are points used to define the surface of the model. By changing the position of control points over time, the position and shape of an object is changed. Following step 330, method 300 can be repeated for any additional blur parameters associated with objects in the current frame. After all of the objects in a frame have been evaluated to determine their poses, the poses and other aspects of the objects at the evaluation time can be combined with those from the primary frame and any other blur frames, which are also evaluated using method 300. The combined results can be rendered to create an image.

Figure 4A:
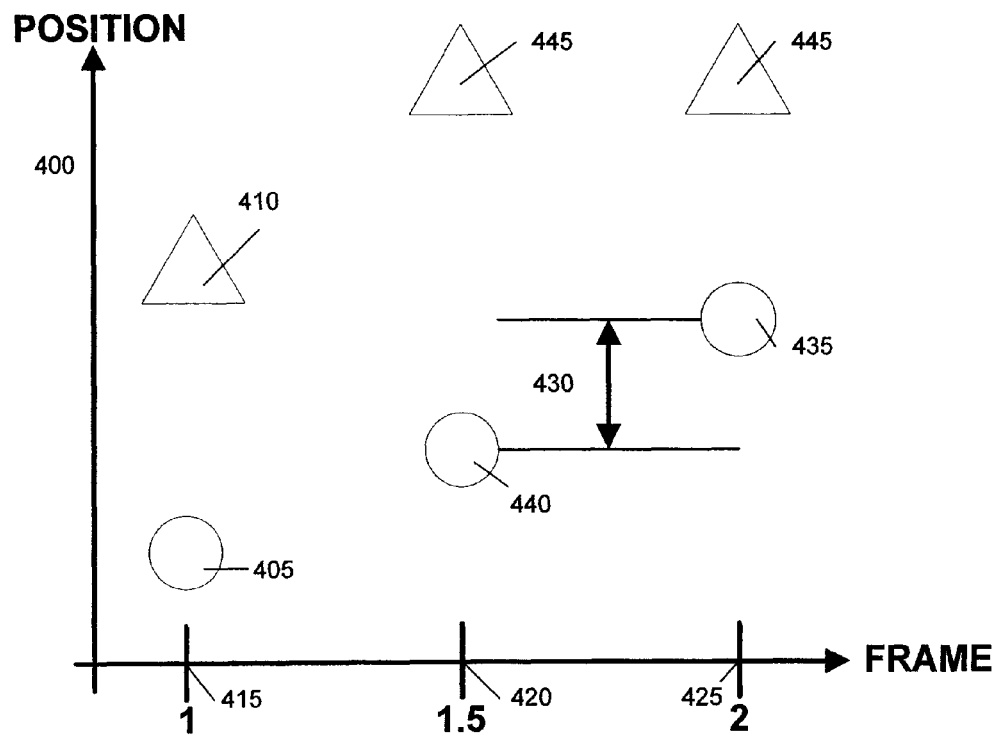
FIGS. 4A-B illustrate example applications of a method of variable motion blur according to an embodiment of the invention.
Figure 4B:
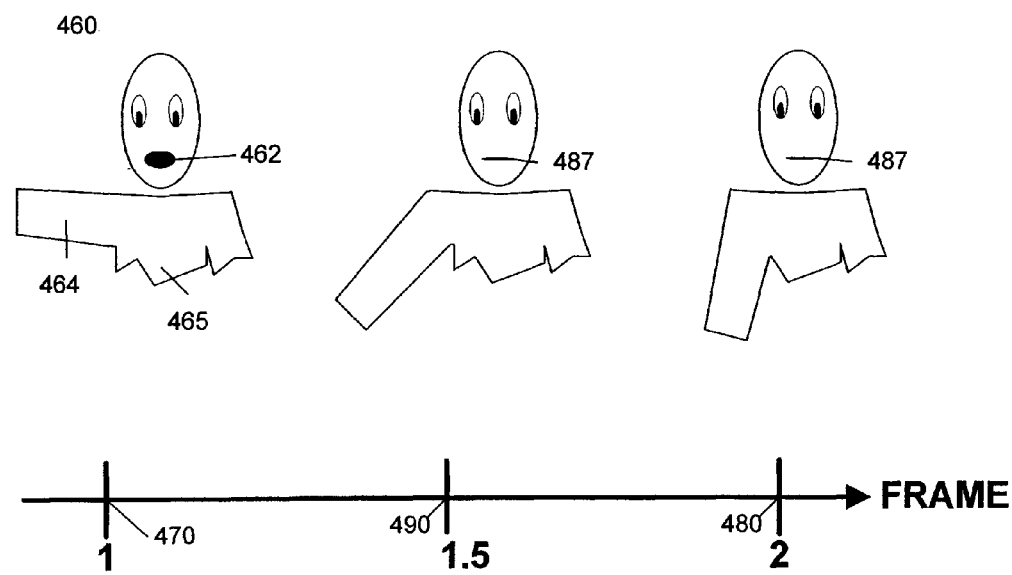

FIGS. 4A-B illustrate example applications of a method of variable motion blur according to an embodiment of the invention. FIG. 4A illustrates an example 400 of variable motion blur applied to different objects in a scene. In example 400, a sphere 405 and a cone 410 are moved from their positions in frame 1, 415 to new positions in frame 2, 425. In this example, a default shutter time of 0.5 frames is applied. Additionally, the sphere 405 is associated with a motion blur parameter value of 1.0, specifying full motion blur, and the cone 410 is associated with a motion blur parameter value of 0.0, specifying no motion blur. In an embodiment, each object's blur parameter is associated with an animation variable controlling the position the object and orientation of the object.

To create a motion blur effect for frame 2, 425, an embodiment evaluates the position of objects 405 and 410 in the primary frame, frame 2, 425, and in the blur frame 1.5, 420. Using method 300, the sphere 405 is located at position 440 in the blur frame 420, which is between its positions in frame 1, 415, and frame 2, 425. Cone 410 has a blur parameter value of 0.0, indicating that no motion blur should be applied. Thus, method 300 evaluates the position of cone 410 in blur frame 420 at an evaluation time of 2, rather than the blur frame time of 1.5. As a result, cone 410 is located at identical positions 445 in blur frame 420 and primary frame 425.

After the objects positioned at the times of the blur frame 420 and the primary frame 425 are combined, rendering will create a blurring of the sphere 405 along its direction of motion due to the difference 430 in positions of the sphere 405 between the primary 425 and blur 420 frames. Conversely, as the position 445 of the cone 410 is unchanged between the primary frame 425 and blur frame 420, the cone 405 will appear sharp and unblurred in the final image.

FIG. 4B illustrates an example 460 of variable motion blur applied to different parts of the same object in a scene. In example 460, the arm 464 and a mouth 462 of a character model 465 are modified from their shape and/or positions in frame 1, 470 to new shapes and/or positions in frame 480. In this example 460, the arm of character model 465 is lowered and the mouth 462 is closed. In this example, a default shutter time of 0.5 frames is applied. Additionally, the arm 464 is associated with a motion blur parameter value of 1.0, specifying full motion blur, and the mouth 462 is associated with a motion blur parameter value of 0.0, specifying no motion blur. In an embodiment, different blur parameters are associated with animation variables controlling the different portions of character model 465.

To create a motion blur effect for frame 2, 480, an embodiment evaluates the position and shape of arm 464 and mouth 462 in the primary frame, frame 2, 480, and in the blur frame 1.5, 490. Using method 300, the arm 464 has a position and shape 489 in the blur frame 490 that is between its positions and shapes in frame 1, 470, and frame 2, 480. Mouth 462 has a blur parameter value of 0.0, indicating that no motion blur should be applied. Thus, method 300 evaluates the position and shape of mouth 462 in blur frame 490 at an evaluation time of 2, rather than the blur frame time of 1.5. As a result, mouth 462 has an identical position and shape 487 in blur frame 490 and primary frame 480.

After the character model poses at the times of the blur frame 490 and the primary frame 480 are combined, rendering will create a blurring of the arm 464 along its direction of motion due to the differences in position and shape of the arm 464 between the primary 480 and blur 490 frames. Conversely, as the position and shape of 487 of the mouth 462 is unchanged between the primary frame 480 and blur frame 490, the mouth 462 will appear sharp and unblurred in the final image.

In a further embodiment, variable motion blur is implemented as a dynamically loaded module in an animation system. This animation system allows animation variables to be associated with user-defined interpolation modules. User-defined interpolation modules determine the value of one or more animation variables at a given time from the values of one or more control points and optionally other parameters. The optional parameters can include the values of other animation variables. In an embodiment, one or more blur parameters can be expressed as animation variables themselves, which are in turn associated with other animation variables via a user-defined interpolation module. User-defined interpolation modules can be written in any programming or scripting language. Interpolation modules are dynamically loaded by the animation system as needed, for example using standard operating system dynamic loading and linking mechanisms such as the Unix dlopen( ).

Figure 5:
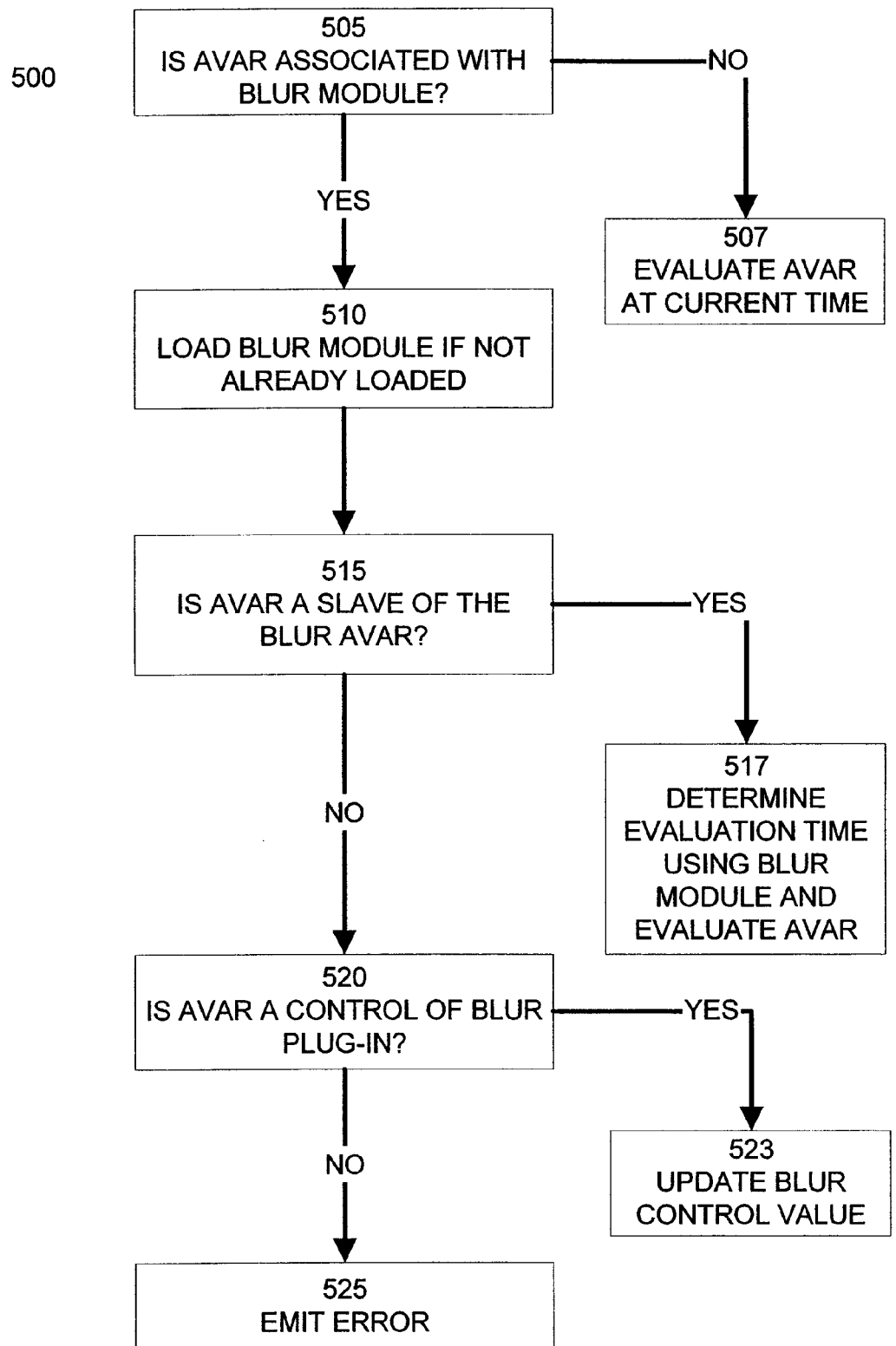
FIG. 5 is a flowchart illustrating the method 500 of operation of a variable motion blur module in a system for evaluating animation variables according to an embodiment of the invention.

FIG. 5 is a flowchart illustrating the method 500 of operation of a variable motion blur module in a system for evaluating animation variables according to an embodiment of the invention. In an embodiment, method 500 is performed to evaluate each animation variable associated with a frame. Step 505 determines whether the animation variable being evaluated, referred to as the current animation variable, is associated with a variable motion blur module. If the current animation variable is not associated with a variable motion blur module, step 507 evaluates the current animation variable at the time of the current frame using its associated interpolation module.

If the current animation variable is associated with a variable motion blur module, the animation system loads and links to a variable motion blur module in step 510. In an embodiment, the animation system first determines whether the variable motion blur module has already been loaded and linked. The animation system then loads and links to the variable motion blur module only if this module has been loaded. In accordance with the discussion above, an embodiment of the variable motion blur module is a user-defined interpolation module that is loaded and linked to the animation system using a standard operation system dynamic loading and linking mechanism.

Step 515 determines if the current animation variable is a slave of a blur animation variable, which specifies the value of a blur parameter. An animation variable is a slave of another animation variable if its value is affected by the value of the other animation variable. In step 515, the current animation variable is a slave of a blur animation variable if the current animation variable is an output of the variable motion blur module. If the current animation variable is a slave of a blur animation variable, step 517 determines the value of the current animation variable using the variable motion blur module and the blur animation variable value. In an embodiment of step 517, the variable motion blur module performs the method 300 to determine the value of the current animation variable. The animation system then uses the value of the current animation variable to modify the position and/or shape of objects for the current frame.

Alternatively, if the current animation variable is associated with the variable motion blur module and is not a slave of the blur animation variable, then step 520 determines if the current animation variable is a blur animation variable. In an embodiment, each animation variable includes a parameter specifying an animation variable type, such as a blur animation variable. If the current animation variable is a blur animation variable, then step 523 determines the value of the blur animation variable for the current frame. In an embodiment, the value of the blur animation variable is determined from interpolation of one or more control points associated with the blur animation variable. In a further embodiment, the blur animation variable is evaluated at the time of the primary frame associated with the current frame, which may or may not be the same as the current frame.

If the current animation variable is associated with the variable motion blur module and is neither a blur animation variable nor a slave to a blur animation variable, step 525 initializes an error reporting mechanism. The animation system can then alert users that the current animation variable is misconfigured.

Method 500 can be repeated for each animation variable associated with a frame. Once all of the animation variables have been evaluated and the associated objects have been positioned and/or shaped accordingly, the poses and other aspects of objects in the current frame can be combined with those of other frames and rendered to create an image with motion blur applied according to the values of one or more blur animation variables associated with the frames.

Figure 6:
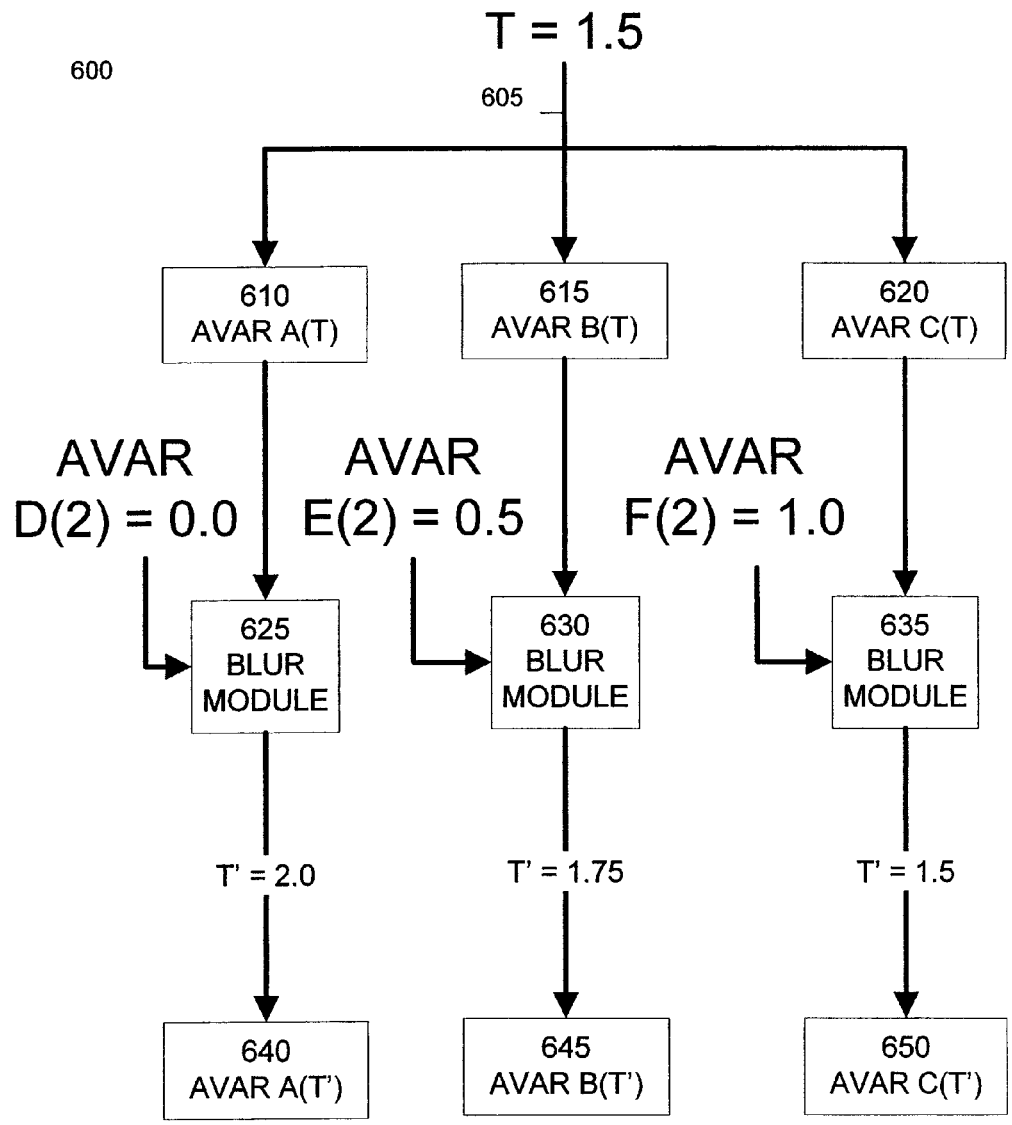
FIG. 6 illustrates an example application of variable motion blur to a set of animation variables according to an embodiment of the invention.

FIG. 6 illustrates an example application 600 of variable motion blur to a set of animation variables according to an embodiment of the invention. In this example, the variable motion blur module acts as a proxy or wrapper over the functions associated with other animation variables. In example 600, the primary frame is at time 2, the shutter time is 0.5 frames, and the current frame is a blur frame at time 1.5.

To evaluate example animation variables A, B, and C associated with the current frame, the time of the current frame, 1.5, is used as the input 605 for animation variable functions A(t) 610, B(t) 615, and C(t) 620. In this example 600, animation variables A, B, and C are associated with different blur animation variables. Thus, each animation variable function uses an instance of the variable motion blur module to evaluate these animation variables at the time of the current frame. The parameters associated with each animation variable functions 610, 615, and 620, including the associated blur animation variables D, E, and F, are passed to variable motion blur modules 625, 630, and 635, respectively. Each of the variable motion blur modules 625, 630, and 635 operate according to methods 500 and 300 described above and determine an evaluation time for its associated animation variable based upon the time of the current frame and context of the current frame (e.g. a primary frame or a blur frame) and the value of the associated blur animation variable. In an embodiment, each variable motion blur module evaluates its associated blur animation variable at the time of the primary frame, regardless of the context of the current frame.

For animation variable A and an associated blur animation variable D, which has a value of 0.0 at the primary frame time of 2, variable motion blur module 625 determines an evaluation time of 2.0, which will eliminate motion blur for objects or portions thereof associated with animation variable A. Similarly, for animation variable B and an associated blur animation variable value E, which has a value of 0.5 at the primary frame time of 2, the variable motion blur module 630 determines an evaluation time of 1.75, which will reduce motion blur from its default value for objects or portions thereof associated with animation variable B. For animation variable C and an associated a blur animation variable F, which has a value of 1.0 at the primary frame time of 2, the variable motion blur module 635 determines an evaluation time of 1.5, which results in the application of the default amount of motion blur value to objects or portions thereof associated with animation variable C.

Using their evaluation times determined from the variable motion blur modules 625, 630, and 635, animation variables A, B, and C are evaluated using their associated functions 640, 645, and 650 respectively. As typical scenes may include hundreds or thousands of animation variables and millions of associated control points, integrating a new effect into the animation system would be an arduous task. However, this embodiment of variable motion blur effect does not change the functions associated with animation variables; rather, the variable motion blur modules modify the evaluation time used to determine the value of these animation variables for the current frame. Thus, this embodiment easily integrates variable motion blur effects with the animation system and existing character models and other objects.

It should be noted that a control point can be controlled by a weighted combination of the outputs of two or more animation variables. In this circumstance, the application of variable motion blur to one of the animation variables associated with a control point will affect that animation variables contribution to the control point, but will not alter the output of the other associated animation variables. For example, a control point on the mouth of a character model can be controlled by a weighted combination of the outputs of a "lip curl" animation variable and a "jaw open/close" animation variable. Associating a variable motion blur animation variable with the "jaw open/close" animation variable will modify this contribution of this animation variable to the control point in blur frames. However, the contribution of the "lip curl" animation variable to the position of the control point will be unchanged.

Animators typically specify the movement of an object with a set of control points defining a path. The set of control points and an interpolation function are then used to specify the position of the object at any arbitrary time. Because animation is created by evaluating frames at discrete moments of time, animators often only verify the validity of a path at each primary frame. However, when using motion blur, it is often necessary to evaluate additional blur frames located between the primary frames defined by an animator. If the path defined by the animator is poorly behaved or undefined between the primary frames, errors or unwelcome visual artifacts can occur.

Figure 7:
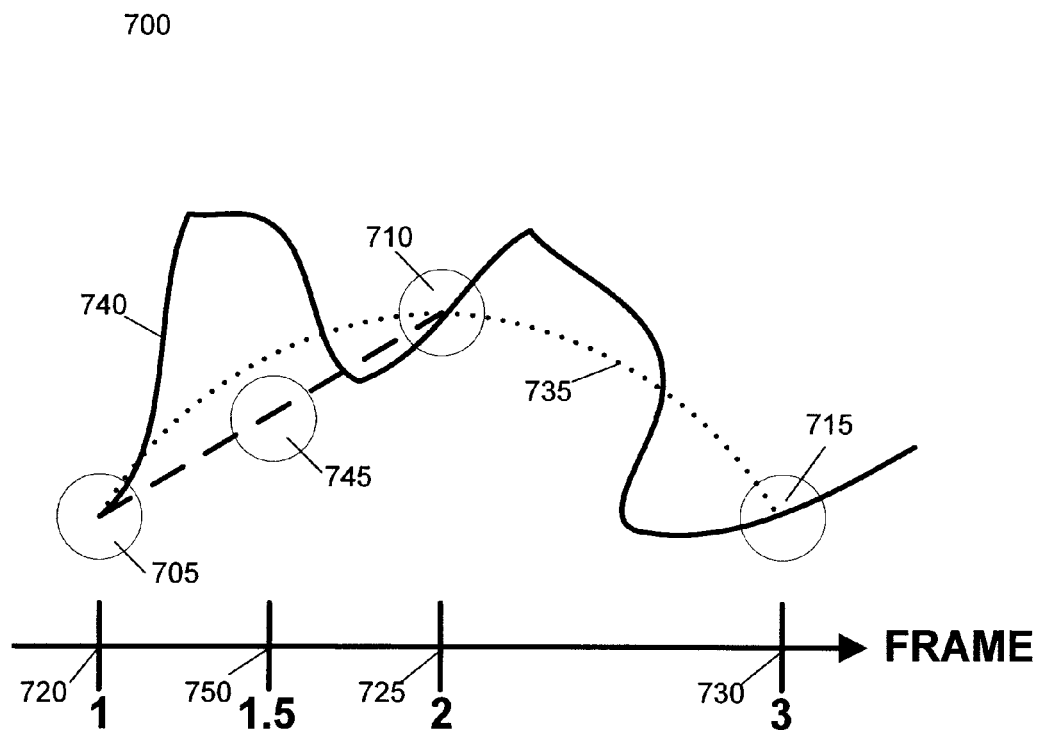
FIG. 7 illustrates an example of an interpolation scheme for evaluating geometry between frames suitable for use with an embodiment of the invention.

FIG. 7 illustrates an example 700 of an interpolation scheme for evaluating geometry between frames suitable for use with an embodiment of the invention. In this example, an object is located at positions 705, 710, and 715 in frame 1, 720; frame 2, 725; and frame 3, 730, respectively. Although the animator may have intended a smooth path, such as path 735, for the object, due to the selection of the interpolation function and the set of control points, the actual path defined for the object is path 740. To prevent the introduction of unwelcome visual artifacts, an embodiment of the animation system determines the position 745 of the object in blur frame 750 by interpolating between the positions defined in two or more adjacent primary frames. An embodiment of the animation system uses this type of interpolation to determine the value of any animation variable in a blur frame. For example, the position 745 of the object in blur frame 750 can be determined by linearly interpolating between the positions 705 and 710 in primary frames 720 and 725. Alternate embodiments may use more complex interpolation functions and/or positions from additional adjacent primary frames.

Further embodiments can be envisioned to one of ordinary skill in the art after reading the attached documents. For example, variable motion blur effects can be implemented with multiple segment motion blur, which associates multiple blur frames with each primary frame. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of creating motion blur in a computer generated image, the method comprising:
    receiving a first blur parameter value associated with a first animation variable;
    determining a first evaluation time of the first animation variable based on the first blur parameter value;
    determining a first animation variable value based on the first evaluation time;
    determining a first modification of an object in a scene based on the first animation variable value;
    receiving a second blur parameter value associated with a second animation variable;
    determining a second evaluation time of the second animation variable based on the second blur parameter value;
    determining a second animation variable value based on the second evaluation time;
    determining a second modification of the object in the scene based on the second animation variable value;
    applying the first and second modifications to the object using a computer processor to create a modified object, wherein the object includes at least one control point, and applying the first and second modifications comprises:
        a) evaluating at least a first function using the first animation variable value to determine a first control point component, wherein the first control point component is based on the first evaluation time;
        b) evaluating at least a second function using the second animation variable value to determine a second control point component, wherein the second control point component is based on the second evaluation time; and
        c) combining the first and second control point components to determine a position of the control point based on at least the first and second evaluation times by:
            1) weighting the first control point component according to a first weight associated with at least the first animation variable;
            2) weighting the second control point component according to a second weight associated with at least the second animation variable; and
            3) combining the weighted first and second control point components to determine the position of the control point; and
    rendering the modified object including the first and second modifications to create at least a portion of a computer-generated image including the object.

2. The method of claim 1, wherein the first modification includes a first portion of the object posed according to the first evaluation time and the second modification includes a second portion of the object posed according to the second evaluation time.

3. The method of claim 1, wherein:
    the first modification includes a first portion of a pose of a first portion of the object; and
    the second modification includes a second portion of the pose of the first portion of the object;
    wherein the first portion of the pose is determined based on the first evaluation time and the second portion of the pose is determined based on the second evaluation time.

4. The method of claim 1, wherein:
    the first animation variable is associated with a first type of motion of the control point; and
    the second animation variable is associated with a second type of motion of the control point.

5. The method of claim 4, wherein the first type of motion of the control point includes rotation.

6. The method of claim 4, wherein the first type of motion of the control point includes translation.

7. The method of claim 1, wherein the first blur parameter value is based on a color of an entity in the scene.

8. The method of claim 1, wherein the first blur parameter value is associated with a second object in the scene.

9. The method of claim 8, wherein the second object includes a camera.

10. The method of claim 8, wherein the second object includes a light.

11. The method of claim 1, wherein the first modification of the object includes a modification of geometry of the object.

12. The method of claim 1, wherein the first modification of the object includes a modification of a non-geometric attribute of the object.

13. The method of claim 12, wherein the non-geometric attribute of the object are selected from a group consisting of color, lighting, shading, textures, images, and displacement maps.

14. The method of claim 1, wherein the first blur parameter value specifies a shutter time parameter defining a first motion blur effect.

15. The method of claim 1, wherein the first blur parameter value specifies a motion blur effect modifying a default time value.

16. The method of claim 1, wherein the first blur parameter value varies as a function of time.

17. The method of claim 16, wherein the first blur parameter value is derived from a blur animation variable.

18. The method of claim 16, wherein the first blur parameter value is derived from a non-blur animation variable.

* * * * *